C. M. SMITH.
Picture-Hanger
No. 168,113. Patented Sept. 28, 1875.
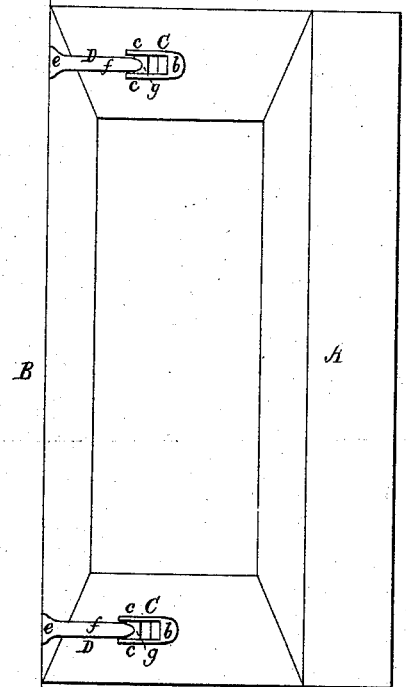
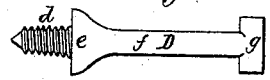
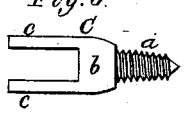
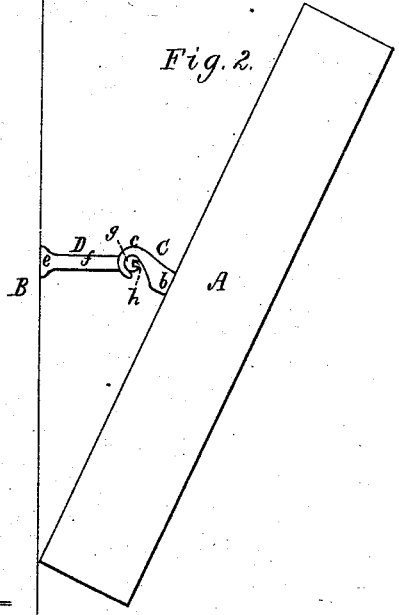
Witnesses.
S. W. Piper
L. W. Miller
Charles M. Smith
by his attorney
R. H. Eddy

UNITED STATES PATENT OFFICE.

CHARLES M. SMITH, OF BOSTON, MASSACHUSETTS.

IMPROVEMENT IN PICTURE-HANGERS.

Specification forming part of Letters Patent No. 168,113, dated September 28, 1875; application filed August 10, 1875.

*To all whom it may concern:*

Be it known that I, CHARLES M. SMITH, of Boston, of the county of Suffolk and State of Massachusetts, have invented a new and useful Improvement in Picture-Hangers; and do hereby declare the same to be fully described in the following specification and represented in the accompanying drawings, of which—

Figure 1 denotes a top view, and Fig. 2 a side elevation, of a picture fixed to a wall by my invention. Fig. 3 is a top view of one of the double-hooked screws, while Fig. 4 is a top view of the T-headed screw with which such double-hooked screw operates.

In the drawings, A denotes the picture, and B the wall, or parts of both, there being screwed into the back of the frame of the said picture two of the double-hooked screws C, and into the wall two of the T-headed screws D, to be hereinafter described. Each screw C is composed of a common screw, $a$, a head, $b$, and two hooks, $c$ $c$, the screw being extended in one direction from the head $b$, while the hooks are projected from it in the opposite direction, and at a short distance apart. The T-headed screw has a screw, $d$, from whose head $e$ there projects a shank, $f$, terminating in a cylindrical cross-head, $g$. This head $g$ is arranged at right angles with the shank $f$, and projects in opposite directions therefrom, all as shown. Such head $g$ may be nicked lengthwise, as shown at $h$, to receive a screw-driver for setting the screw $d$ into a wall.

In using the picture-hanger the hooked prongs of each screw C are to embrace the shank $f$ and hook upon the cross-head $g$, all as shown in the drawings. When two of the parts C are screwed into the picture-frame and into the wall at suitable distances apart, two of the parts D are screwed.

I claim as my invention—

A picture-hanger composed of the duplex-hooked screw C and a T-headed screw, D, all constructed substantially in the manner and for the use as specified.

CHARLES M. SMITH.

Witnesses:
R. H. EDDY,
J. R. SNOW.